(12) United States Patent
Hattass et al.

(10) Patent No.: US 6,857,693 B2
(45) Date of Patent: Feb. 22, 2005

(54) SUN SCREEN FOR A MOTOR VEHICLE

(75) Inventors: Rainer Hattass, Gründau (DE); Tobias Christian, Frankfurt (DE)

(73) Assignee: ArvinMeritor GmbH (DE)

( * ) Notice: Subject to any disclaimer, the term of this patent is extended or adjusted under 35 U.S.C. 154(b) by 0 days.

(21) Appl. No.: 10/660,396

(22) Filed: Sep. 10, 2003

(65) Prior Publication Data

US 2004/0056504 A1 Mar. 25, 2004

(30) Foreign Application Priority Data

Sep. 23, 2002 (DE) .......................... 102 44 156

(51) Int. Cl.⁷ .................. B60J 1/20; B60J 3/02
(52) U.S. Cl. ......................... 296/214; 296/97.8
(58) Field of Search .............. 296/214, 141, 296/97.8

(56) References Cited

U.S. PATENT DOCUMENTS

| | | | | |
|---|---|---|---|---|
| 5,267,768 A | * | 12/1993 | Tsai | 296/97.8 |
| 5,599,059 A | * | 2/1997 | Shann | 296/216.04 |
| 6,520,569 B2 | * | 2/2003 | Wingen et al. | 296/214 |
| 6,634,703 B1 | * | 10/2003 | De Gaillard | 296/214 |
| 2001/0054833 A1 | | 12/2001 | Wingen et al. | |

FOREIGN PATENT DOCUMENTS

| | | | | |
|---|---|---|---|---|
| DE | 917654 | * | 9/1954 | 296/97.8 |
| DE | 44 24 188 C1 | | 12/1995 | |
| DE | 196 15 799 A1 | | 11/1997 | |
| DE | 197 50 713 C1 | | 12/1998 | |
| DE | 198 14 577 C1 | | 10/1999 | |
| EP | 1 147 932 A1 | | 10/2001 | |
| EP | 1 285 794 A1 | | 2/2003 | |
| FR | 2 827 225 A1 | | 1/2003 | |

OTHER PUBLICATIONS

Search Report, Austrian Patent Office, dated Nov. 8, 2002.
European Search Report, Apr. 13, 2004.

* cited by examiner

*Primary Examiner*—Dennis H. Pedder
(74) *Attorney, Agent, or Firm*—Carlson, Gaskey & Olds

(57) ABSTRACT

A motor vehicle sun screen device for a vehicle roof module has at least one guideway which extends from back to front in a longitudinal direction of a roof module, a housing which is mounted on the roof module, a first sun screen that can be moved forward from the housing and that is guided in the guideway, at least one cassette mounted on the lower edge of the first sun screen, and a second sun screen contained in the cassette.

21 Claims, 2 Drawing Sheets

SUN SCREEN FOR A MOTOR VEHICLE

REFERENCE TO RELATED APPLICATIONS

The present invention claims the benefit of German Patent Application No. 102 44 156.1, filed Sep. 23, 2002.

TECHNICAL FIELD

The invention relates to an assembly made up of a roof module for a motor vehicle and a sun screen device.

BACKGROUND OF THE INVENTION

There are many different known sun screen devices for use in vehicles. In particular, where there is a roof module having a transparent area (e.g., a glass sliding roof), sun screen devices are used to reduce the amount of sunlight that passes into the interior of the vehicle.

Recently, roof modules have been developed that have an especially large transparent area. These new roof modules usually have a panoramic windshield composed of a windshield area and a roof area that merge into one another without any intervening structure, such as a crossbar or frame. With this structure, it has been possible to realize an interior that is flooded with light and that has very good panoramic visibility. Nevertheless, a roof module of this type makes severe demands on the sun screen device because unimpeded sunshine passing into the interior of the vehicle would result in unpleasantly high temperatures in the interior.

There is a desire for a sun shade structure that can control entry of sunlight through a panoramic windshield.

SUMMARY OF THE INVENTION

The invention is generally directed to a sun screen device that functions very flexibly to provide shade for the interior of the vehicle in the desired manner. According to one embodiment of the invention, the device includes at least one guideway which extends in the longitudinal direction from back to front, a housing that is mounted on the roof module, a first sun screen that can slide forward from the housing and is guided by the guideway, at least one cassette mounted on the front edge of the first sun screen, and a second sun screen contained in the cassette. The first sun screen makes it possible to provide the desired degree of shade from the sunshine in the roof area of the panoramic windshield. Additionally, if desired, the second sun screen can be extended to make it possible to adjust the degree of shade to any specific requirements.

In one embodiment, the first sun screen can be a roll-up shade that can be extended from the housing that is mounted on the roof module. The second sun screen can also be a roll-up shade that is pulled down along the windshield after the first sun screen has been pulled forward up to the area of the overlap between the roof area and the windshield area. In this context, the second sun screen can be operated in two parts so that the driver and the passenger can each individually adjust the second sun screen to shade his or her own side of the vehicle.

In one embodiment, the cassette for the second sun screen can be mounted on the first sun screen in a hinged fashion so that it functions as a sun visor.

BRIEF DESCRIPTION OF THE DRAWINGS

The invention is described below on the basis of various embodiments which are depicted in the attached drawings as follows.

DETAILED DESCRIPTION OF THE EMBODIMENTS

Figure 1:
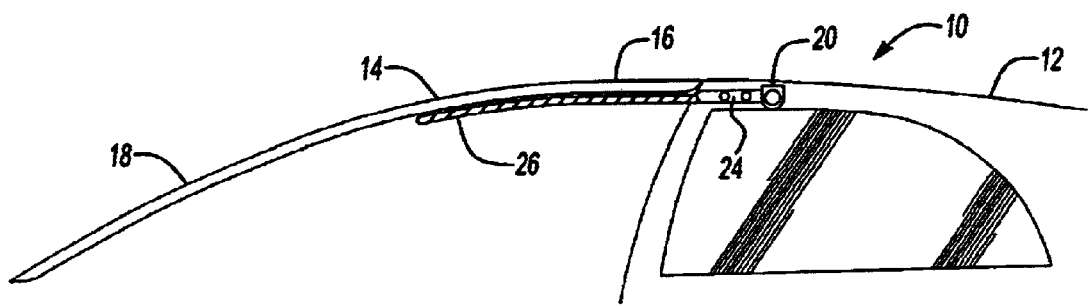
FIG. 1 is a schematic side view depicting a roof module having a sun screen device mounted thereon, in a starting position.

FIG. 1 illustrates one embodiment of a roof module 10 that contains a rear roof area 12 and a panoramic windshield 14 constituting the front roof area. The panoramic windshield 14 can be made of glass or a suitable plastic and it has a roof area 16 which is joined to the rear roof area 12 as well as to a windshield area 18.

At the rear roof area 12, just before the beginning of the panoramic windshield 14, a housing 20 is disposed and contains a first sun screen 22. The first sun screen 22 is a roll-up shade which is taken up in the housing 20. A cassette 24 is disposed at the front edge of the first sun screen 22 and extends transversely with respect to the longitudinal direction of the vehicle. The cassette 24 is guided on both sides by a guideway 26, which is configured as a guide rail in this embodiment. Both guide rails extend parallel to each other in the longitudinal direction of the vehicle along the side edges of the roof module, specifically from the housing 20 forward up to the transition from the roof area 16 of the panoramic windshield 14 to the windshield area 18. A second sun screen 28 is accommodated in the cassette 24 and is also configured as a roll-up sun screen in this embodiment.

In FIG. 1, the sun screen device, which is made up of the first sun screen 22 and the second sun screen 28 in this embodiment, is depicted in the starting position in which the second sun screen 28 is completely taken up in the cassette 24 and the first sun screen 22 is completely taken up in the housing 20. The cassette 24 is therefore located outside of the light-transparent area of the roof module, the area being determined by the panoramic windshield.

Figure 2:
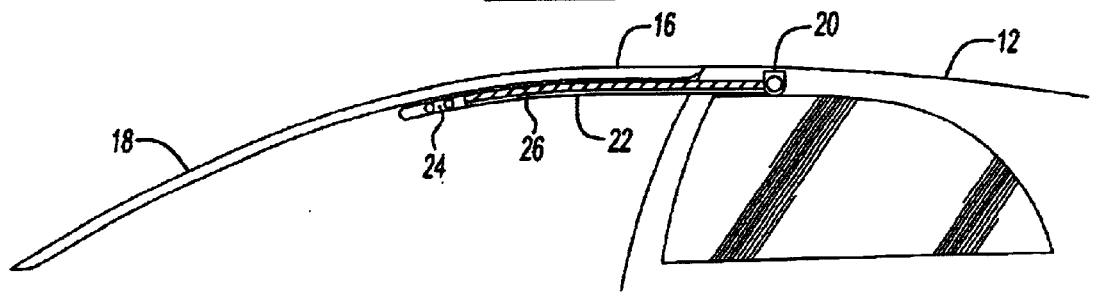
FIG. 2 illustrates the assembly from FIG. 1 in which a first sun screen is extended.

FIG. 2 shows a position of the sun screen device is depicted in which the cassette 24 is pulled forward up to the front end of the guideway 26. In this context, the first sun screen 22 is pulled out of the housing 20; it thus extends underneath the roof area 16 of the panoramic windshield 14 between the cassette 24 and the housing 20.

Figure 3:
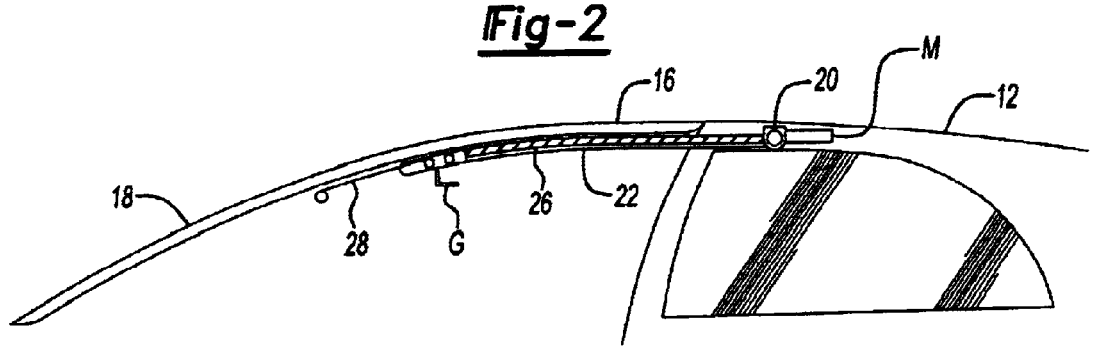
FIG. 3 illustrates the assembly from FIG. 2 in which a second sun screen is partially extended.

FIG. 3 shows a position of the sun screen device in which the second sun screen 28 is partially pulled out of the cassette 24. The second sun screen 28 here functions as a sun visor.

Figure 4:
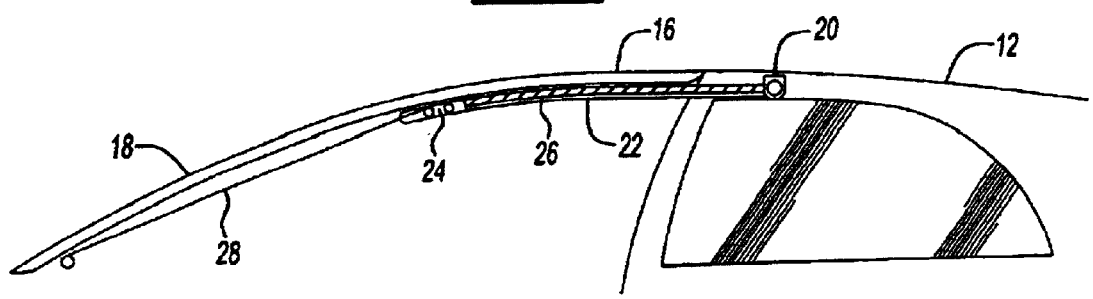
FIG. 4 illustrates the assembly from FIG. 2 in which a second sun screen is completely extended.
Figure 4A:
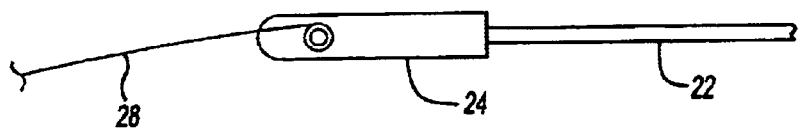
FIG. 4a illustrates a cassette in the assembly of FIG. 2 in greater detail.

FIGS. 4 and 4a illustrate a position in which the second sun screen 28 is completely pulled out of the cassette 24. The second sun screen 28 therefore extends along the windshield area 18 of the panoramic windshield 14 and is advantageously secured at the lower end of the windshield area 18. This position is especially appropriate when the vehicle is parked in the sun.

The cassette 24 can be made up of two partial segments so that separate second sun screens are provided for the driver and for the passenger. This makes it possible to provide shade for windshield area 18 in different ways.

Figure 5:
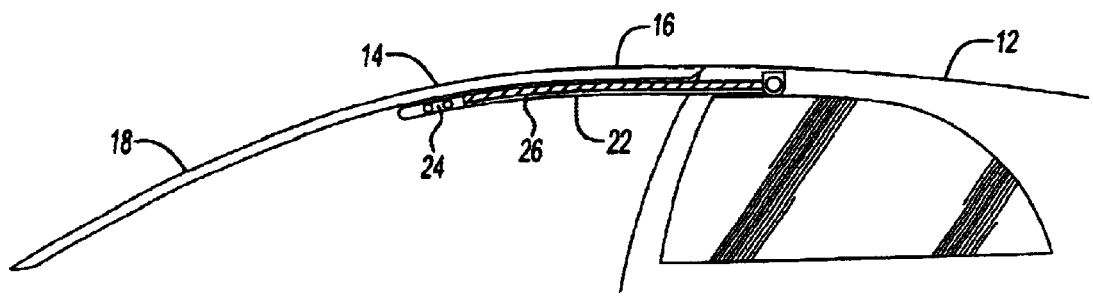
FIG. 5 illustrates an assembly according to a second embodiment in which a first sun screen is extended.
Figure 6:
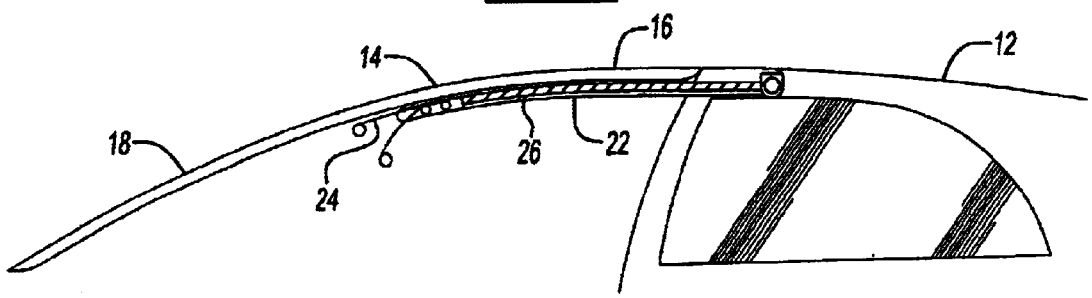
FIG. 6 illustrates the assembly from FIG. 5 in which a second sun screen is unfolded.
Figure 7:
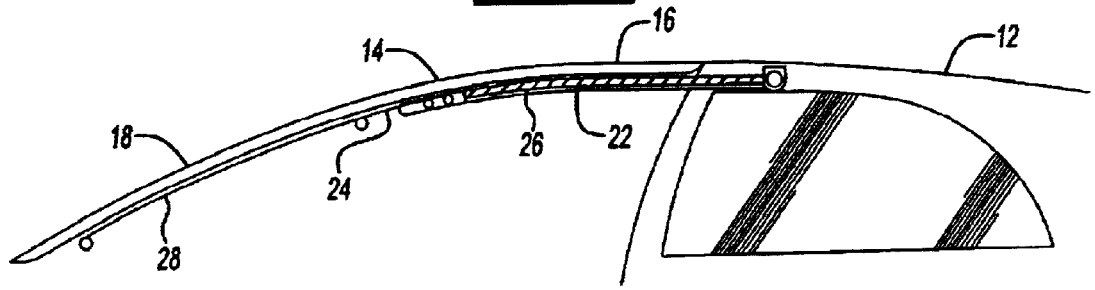
FIG. 7 illustrates the assembly from FIG. 6 in which a second sun screen is completely extended.

FIGS. 5 through 7 illustrate a second embodiment of the inventive sun screen device. For the components that are known from the first embodiment, the same reference numerals will be used, and for them the above explanations are referenced.

Figure 6A:
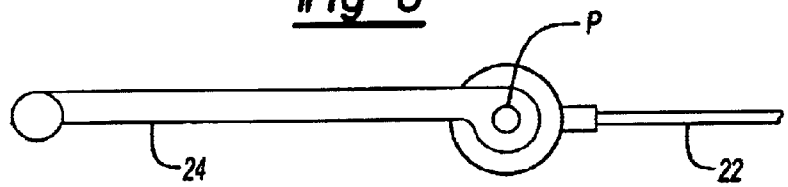
FIG. 6a illustrates a hinged attachment in the assembly of FIG. 6 in greater detail.

The difference from the first embodiment lies in the fact that the cassette 24 in this embodiment is attached in a hinged manner, such as via a pivot P, on the front end of the first sun screen 22 (FIG. 6a).

In FIG. 5, the cassette 24 is shown as being folded back on the first sun screen 22. In FIG. 6, it is evident that the cassette 24 can be folded out forward toward the windshield area 18. It functions as a sun visor as explained above. In FIG. 7, it is evident that the second sun screen 28 can be pulled forward out of the cassette 24 to completely cover the windshield area 18.

In both embodiments, the cassette 24 and therefore the first sun screen 22 can be moved either manually via a grip G or using an electrical drive device, such as an electric motor M (e.g., FIG. 3).

Figure 8:
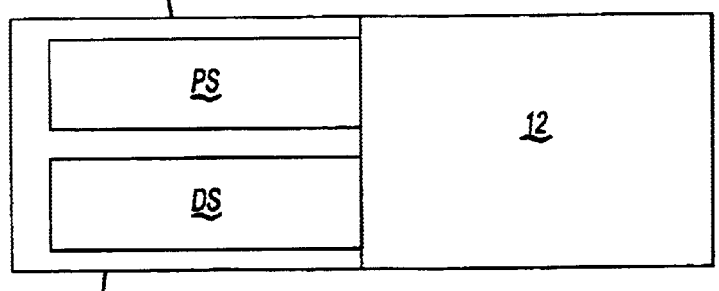
FIG. 8 is a top view of an assembly according to another embodiment of the invention.

Note that the second sunscreen can be divided and operated as two independent parts, such as a driver side part DS and a passenger side part PS, so that the driver and the passenger can each individually adjust the second sun screen to shade his or her own side of the vehicle (FIG. 8).

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A sunscreen device for a motor vehicle roof module, comprising:
   at least one guideway extending forwardly from the back of the motor vehicle roof module in a longitudinal direction;
   a housing;
   a first sun screen that is movable in a forward direction from the housing and that is guided in the guideway; and
   at least one cassette mounted on a front end edge of the first sun screen, said at least one cassette containing a second sun screen.

2. The device as recited in claim 1, wherein the first sun screen is a roll-up shade.

3. The device as recited in claim 1, wherein the second sun screen is a roll-up shade.

4. The device as recited in claim 1, wherein the second sun screen is a sun visor.

5. The device as recited in claim 1, further comprising a grip attached to the first sun screen to allow manual movement of the first sun screen.

6. The device as recited in claim 1, further comprising an electrical drive device operably coupled to the first sun screen to operate the first sun screen.

7. The device as recited in claim 1, wherein the cassette is mounted on the first sun screen in a hinged manner.

8. The device as recited in claim 1, wherein said at least one cassette comprises a driver-side cassette containing a driver-side sun screen and a passenger-side cassette containing a passenger-side sun screen.

9. The device as recited in claim 8, wherein the driver-side sun screen and the passenger-side sun screen can be operated independently of one another.

10. A vehicle roof module, comprising:
    a windshield; and
    a sun screen device for covering at least a portion of the windshield, the device having
       at least one guideway extending forwardly from the back of the motor vehicle roof module in a longitudinal direction,
       a housing mounted on the roof module,
       a first sun screen that is movable in a forward direction from the housing and that is guided in the guideway, and
       at least one cassette mounted on a front end edge of the first sun screen,
    said at least one cassette containing a second sun screen.

11. The vehicle roof module as recited in claim 10, wherein the windshield is a panoramic windshield having a windshield area and a roof area, wherein the first sun screen covers the roof area and the second sun screen covers the windshield area.

12. The vehicle roof module as recited in claim 11, wherein the windshield area and the roof area merge into each other without any intervening structure.

13. The vehicle roof module as recited in claim 10, wherein the housing of the sun screen device is disposed adjacent the windshield in a rear roof area.

14. The vehicle roof module as recited in claim 10, wherein the first sun screen is a roll-up shade.

15. The vehicle roof module as recited in claim 10, wherein the second sun screen is a roll-up shade.

16. The vehicle roof module as recited in claim 10, wherein the second sun screen is a sun visor.

17. The vehicle roof module as recited in claim 10, further comprising a grip attached to the first sun screen to allow manual movement of the first sun screen.

18. The vehicle roof module as recited in claim 10, further comprising an electrical drive device operably coupled to the first sun screen to operate the first sun screen.

19. The vehicle roof module as recited in claim 10, wherein the cassette is mounted on the first sun screen in a hinged manner.

20. The vehicle roof module as recited in claim 10, wherein said at least one cassette comprises a driver-side cassette containing a driver-side sun screen and a passenger-side cassette containing a passenger-side sun screen.

21. The vehicle roof module as recited in claim 20, wherein the driver-side sun screen and the passenger-side sun screen can be generated independently of one another.

* * * * *